United States Patent [19]

Ohashi et al.

[11] Patent Number: 4,881,509

[45] Date of Patent: Nov. 21, 1989

[54] ELECTRONIC CONTROL DEVICE FOR INTERNAL COMBUSTION ENGINE WITH EGR CONTROL APPARATUS

[75] Inventors: Michihiro Ohashi, Mishima; Norio Nakamura, Susono, both of Japan

[73] Assignee: Toyota Jidosha Kabushiki Kaisha, Toyota, Japan

[21] Appl. No.: 234,373

[22] Filed: Aug. 19, 1988

[30] Foreign Application Priority Data

Aug. 21, 1987 [JP] Japan .................................. 62-208913

[51] Int. Cl.⁴ ............................................ F02M 25/06
[52] U.S. Cl. ..................................... 123/571; 123/480; 123/486
[58] Field of Search ............... 123/416, 417, 418, 478, 123/480, 486, 568, 569, 571; 364/431.06

[56] References Cited

U.S. PATENT DOCUMENTS

| | | | |
|---|---|---|---|
| 4,450,824 | 5/1984 | Ando et al. | 123/571 X |
| 4,478,199 | 10/1984 | Narasaka et al. | 123/571 |
| 4,562,821 | 1/1986 | Ikeda | 123/571 X |
| 4,598,684 | 7/1986 | Kato et al. | 123/571 X |
| 4,602,606 | 7/1986 | Kawagoe et al. | 123/571 X |
| 4,630,589 | 12/1986 | Hashiguchi et al. | 123/571 |
| 4,757,683 | 7/1988 | Kawanabe et al. | 123/571 X |

FOREIGN PATENT DOCUMENTS 0065950 4/1983 Japan .
0008443 1/1986 Japan .
0008444 1/1986 Japan .

*Primary Examiner*—Willis R. Wolfe

[57] ABSTRACT

An electronic control device in an internal combustion engine with an EGR apparatus for calculating a predetermined control variable such as a fuel injection time period or an ignition timing, and correcting same to exclude a component stemming from EGR gas in the intake air. The device comprises a first unit for calculating a fundamental value of the fuel injection time period (TP), a second unit for converting the detected intake pressure under the detected atmospheric pressure into a converted intake pressure under the standard atmospheric pressure in response to the detected atmospheric pressure and a third unit for calculating a correcting value (TPE) from data including information regarding the EGR gas under the standard atmospheric pressure and stored as a function of the converted intake pressure (PMT). In this device, the fundamental value can be corrected by subtracting the correcting value from the fundamental value in the case of the fuel injection time period.

7 Claims, 15 Drawing Sheets

TPE

ELECTRONIC CONTROL DEVICE FOR INTERNAL COMBUSTION ENGINE WITH EGR CONTROL APPARATUS

BACKGROUND OF THE INVENTION

1. Field of the invention

The present invention relates to an electronic control device for an internal combustion engine with an exhaust gas recirculating (EGR) control apparatus, in which a certain controlled variable for controlling the engine, such as an amount of fuel to be supplied to the engine or an ignition timing, is corrected when the EGR control valve is opened.

2. Description of the Related Art

It is widely known to control the engine by controlling an amount of fuel to be supplied into the engine or an ignition timing in response to a detected intake pressure (engine vacuum) and a detected revolutional speed of the engine. The intake pressure is usually detected in units of absolute pressure. Also, it is known to detect the atmospheric pressure and to correct the amount of fuel to be supplied to compensate the air-fuel ratio at an altitude location, as disclosed in Japanese Unexamined Patent Publication No. 58-65950. The feature of this publication is to provide only one pressure sensor in the intake passage of the engine, to make it possible to detect either the intake pressure or the atmospheric pressure by only one pressure sensor. The atmospheric pressure can be detected, for example, by an output from such a pressure sensor, delivered just before start-up of the engine.

An exhaust gas recirculating (EGR) apparatus is also known, which includes a vacuum-operated EGR valve. In the engine including such an EGR apparatus, the amount of fuel also can be controlled in response to the detected intake pressure and the detected revolutional speed. The detected intake pressure is used to detect or represent the amount of the intake air, but the amount of the intake air thus obtained from the detected intake pressure includes a component of the EGR gas (i.e., $Q_d = Q_a + Q_e$, where $Q_d$: the detected amount of the intake air, $Q_a$: the amount of the intake fresh air, $Q_e$: the amount of the EGR gas). The EGR gas is a burned gas and does not contribute to the combustion, and thus desirably the amount of fuel in proportion to the intake fresh air only is determined. Therefore, it is necessary to correct the amount of the fuel calculated from the detected intake pressure and subtract a component equalling the amount of EGR gas therein.

In this correction step, variations in the amount of the EGR gas caused by changes in the atmospheric pressure upon a change of altitude must be taken into consideration. One of reason for the variations in the EGR is that the flow of the EGR gas is affected by the pressure difference between the exhaust pressure and the intake pressure; i.e., it is possible to obtain the same intake pressure at a high altitude as at a normal altitude by opening the throttle valve to a greater extent, but the exhaust pressure will become lower at a high altitude, and thus the flow of the EGR gas will be reduced at a high altitude. Also, the EGR valve is operated by the engine vacuum, and the lift of the EGR valve will vary in accordance with the altitude, for a given constant absolute intake pressure (obtained by opening the throttle valve to a greater extent at a high altitude); i.e., the lift of the EGR valve is less at a high altitude since the atmospheric pressure is applied to the opposite side of the diaphragm of the EGR valve to that subjected to the operating engine vacuum, namely, the EGR valve is also operated by a pressure difference. A typical example of the rate of the EGR gas in the intake air attained at a normal altitude, i.e., under a standard atmospheric pressure, is shown in FIG. 8A. Another example of the rate of the EGR gas in the intake air at a high altitude of 3000 meters, in the same engine, is shown in FIG. 8B. In these FIGS. 8A and 8B, the absolute intake pressure at PM1 is identical.

Japanese Unexamined Patent Publication No. 61-8443 discloses an air-fuel ratio control device for an internal combustion engine with an EGR control valve in which an amount of fuel to be supplied to the engine is basically calculated in response to the detected intake pressure and the detected revolutional speed of the engine and corrected when the EGR control valve is opened. To enable this correction when the EGR control valve is open, the control device in this publication prepares a plurality of two dimensional maps as a function of the detected intake pressure and the detected revolutional speed, for use at various altitudes in response to the detected atmospheric pressure, to thereby maintain the air-fuel ratio at a constant value even when the atmospheric pressure changes at various altitudes. This solution, however, requires a plurality of maps for various atmospheric pressures, and thus a complex control device, and a problem remains in this device in that a precise control cannot be obtained.

Japanese Unexamined Patent Publication No. 61-8444 discloses a similar air-fuel ratio control device for an internal combustion engine with an EGR control valve, in which a correction is carried out in response to a detected difference in the exhaust and intake pressures and the detected revolutional speed. This method does not necessitate a plurality of maps and is simple compared to the former solution, but is still unsatisfactory from the viewpoint of a precise control.

The same problems may occur in the case of the ignition timing.

SUMMARY OF THE INVENTION

An object of the present invention is to provide an electronic control device for an internal combustion engine with an EGR apparatus, which can overcome the above described problems caused by variations of the atmospheric pressure at various altitudes.

According to the present invention, there is provided an electronic control device for controlling an internal combustion engine by means of a control value, said engine having an intake pipe, an exhaust pipe, an exhaust gas recirculating passage extending between said exhaust pipe and said intake pipe, and a vacuum-operated control valve arranged in said exhaust gas recirculating passage, said electronic control device comprising:

first detecting means for detecting a revolutional speed of said engine;

second detecting means for detecting an intake pressure in said intake pipe;

third detecting means for detecting an atmospheric pressure;

first calculating means for calculating a fundamental value of said control value in response to said intake pressure and said revolutional speed;

second calculating means for converting said detected intake pressure under said detected atmospheric pressure into a converted intake pressure under a predetermined atmospheric pressure in response to said atmospheric pressure;

third calculating means for calculating a correcting value of said control value in response to said revolutional speed and said converted intake pressure, said correcting value being in correspondence with an amount of recirculated exhaust gas attained under said predetermined atmospheric pressure when said vacuum-operated control valve is opened; and control means for controlling engine operation in response to said fundamental value when said vacuum-operated control valve is closed, and in response to said fundamental value and said correcting value when said vacuum-operated control valve is opened.

With this arrangement, it is possible to obtain a correcting value of the control value in correspondence with the amount of recirculated exhaust gas when the vacuum-operated control valve is opened at any altitude, by preparing only one data or a map representative of the characteristic feature at a normal altitude, for example, as a two dimensional map of the function of the converted intake pressure and the revolutional speed of the engine. Therefore, it is possible to precisely control the engine as required, by the intake fresh air, and to improve the combustion in the engine to thereby reduce the toxic components in the exhaust gas, reduce knocking, and improve the fuel consumption and the drivability of the vehicle. Also, excessive use of the three-dimensional catalyzer is eliminated, due to an appropriate air-fuel ratio, thus preventing overheating of the catalyzer and prolonging the life thereof.

BRIEF DESCRIPTION OF THE DRAWINGS

The present invention will become more apparent from the following description of the preferred embodiments with reference to the accompanying drawings, in which.

DESCRIPTION OF THE PREFERRED EMBODIMENTS

Figure 1A:
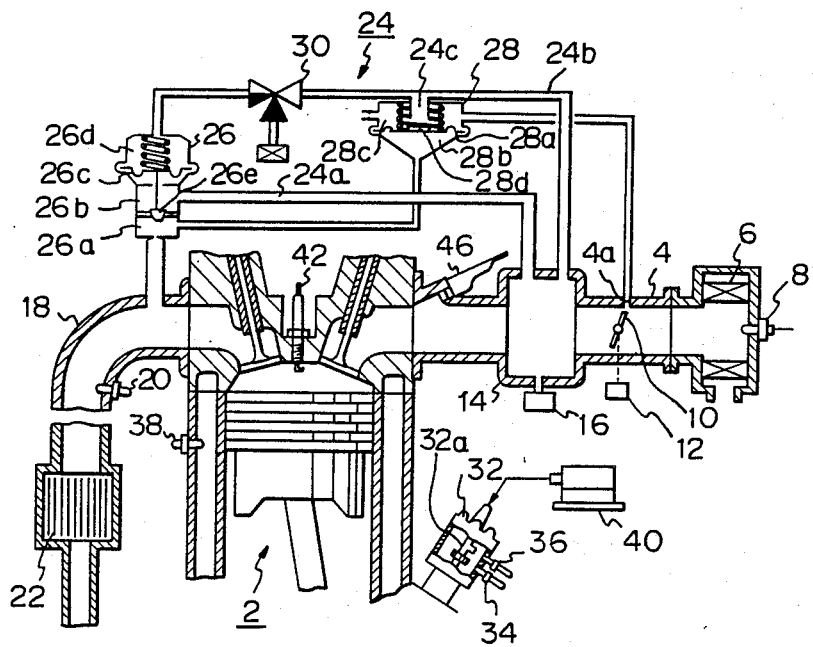
FIG. 1A is a view of an internal combustion engine with an EGR apparatus according to an embodiment of the present invention.

Referring to FIG. 1A, the internal combustion engine 2 has a reciprocable piston and a combustion chamber formed above the piston, and an intake pipe 4 leading from an air cleaner 6 to the engine combustion chamber. In the intake pipe 4, are provided, a temperature sensor 8 for detecting the temperature of the intake air, a throttle valve 10, and a throttle sensor 12 for detecting the opening of the throttle valve 10. The intake pipe 4 also includes a surge tank 14 downstream of the throttle valve 10, for preventing pulsation of the intake air, and a pressure sensor 16 attached to the surge tank 14 for detecting the pressure of the intake air in the surge tank 14 (hereinafter referred to as the intake pressure). A known fuel injector 46 and ignition plug 42 also provided. The engine 2 also has an exhaust pipe 18, in which an air-fuel ratio sensor 20 for detecting the air-fuel ratio of the mixture supplied to the engine through the oxygen concentration in the exhaust gas, and a three-dimensional catalyzer 22 for purifying the exhaust gas.

Also provided is an exhaust gas recirculating (EGR) apparatus 24 including an EGR passage 24a extending between the exhaust pipe 18 and the surge tank 14, and a vacuum-operated EGR valve 26 arranged in the EGR passage 24a. As is well known, the EGR valve 26 comprises a constant pressure chamber 26a, a valve chamber 26b, a diaphragm 26c, a vacuum chamber 26d, and a valve member 26e attached to the diaphragm 26c and arranged in the valve chamber 26b to open or close the EGR passage 24a. The vacuum chamber 26d is connected to the surge tank 14 via a vacuum passage 24b, so that the diaphragm 26c can be moved by the engine vacuum to actuate the valve member 26e. A spring is arranged in the vacuum chamber 26d to bias the diaphragm 26c and the atmospheric pressure is applied to the diaphragm 26c from the side opposite to the vacuum chamber 26d.

Also, a vacuum control valve 28 and a solenoid-operated valve 30 are provided. The solenoid-operated valve 30 selectively connects the vacuum chamber 26d of the EGR valve 26 to the surge tank 14 or to the atmosphere in accordance with the operating condition of the engine. The EGR valve 26 is opened when the vacuum chamber 26d is connected to the surge tank 14 by the engine vacuum and closed when the vacuum chamber 26d is connected to the atmosphere. The vacuum control valve 28 comprises a diaphragm 28a with a valve member 28d attached thereto, a constant pressure chamber 28b connected to the constant pressure chamber 26a of the EGR valve 26, and a diaphragm chamber 28c connected to the intake pipe 4 by an EGR port 4a and to the atmosphere. A valve port 24c extends from the vacuum passage 24b, and the valve member 28d engages with the valve port 24c to relieve the vacuum in the vacuum passage 24b, to thereby control the vacuum fed toward the vacuum chamber 26d in accordance with the position of the throttle valve 10. When the position of the throttle valve 10 is below the EGR port 4a, the pressure in the vacuum passage 24b reaches a value closer to the atmospheric pressure, and when the position of the throttle valve 10 is above the EGR port 4a, the valve member 28d closes the valve port 24c so that the pressure in the vacuum passage 24b reaches a value closer to the engine vacuum. In this manner, the EGR valve 26 controls the amount or rate of the EGR gas in accordance with engine vacuum, i.e., in accordance with the load of the engine as well as the revolutional speed thereof.

Sensors other than those described above for detecting the operating condition of the engine are provided. For example, a revolutional speed sensor 34 is attached to a distributor 32 for detecting the revolutional speed of the engine by detecting the revolutional speed of a rotor 32a of the distributor 32. A cylinder reference sensor 36 is also attached to the distributor 32 for detecting the reference position of the piston by outputting a pulse at every two revolutions of the crankshaft of the engine determined from the revolutional movement of the distributor 32. As is well known, the distributor 32 distributes a high voltage supplied through an igniter 40 to ignition plugs 42 (only one shown in FIG. 1A) in synchronization with the rotation of the crankshaft. The ignition timing by the ignition plugs 42 can be controlled by the igniter 40. Further, a temperature sensor 38 detects the temperature of the engine cooling water.

Figure 1B:
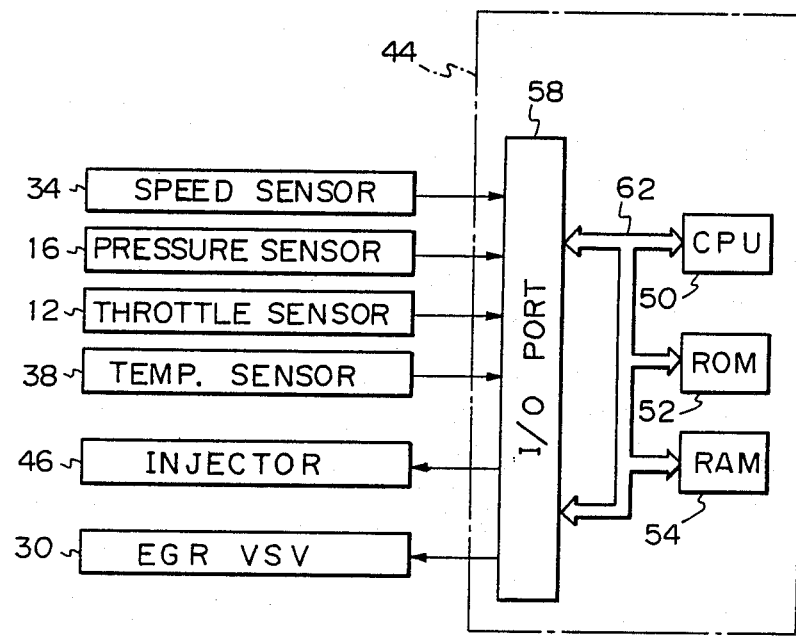
FIG. 1B is a block diagram constituting an electronic control unit.

Referring to FIG. 1B, an electronic control unit 44 is provided for controlling the engine. The electronic control unit 44 is constituted by a microcomputer system comprising, a central processing unit (CPU) 50 having a control and arithmetic functions, a read only memory (ROM) 52 for storing a desired program and data, and a random access memory (RAM) 54 for storing necessary information. A common bus 62 interconnects these elements and an input and output (I/O) port 58 connects the outer members. To simplify the description, only four sensors 34, 16, 12, and 38 are shown in FIG. 1B. The electronic control unit 44 outputs control signals for the fuel injectors 46 and the solenoid-operated valve 30 for opening or closing the EGR valve 26.

Figure 2:
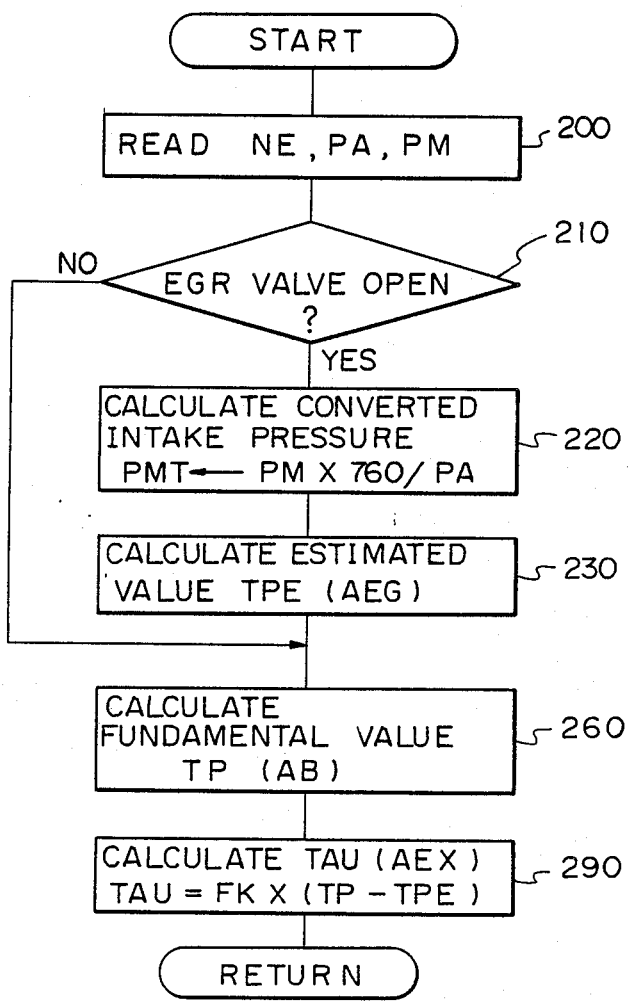
FIG. 2 is a flow chart for calculating a control variable for controlling the engine and including a correction step when an EGR valve is opened, according to the first embodiment of the present invention.
Figure 4:
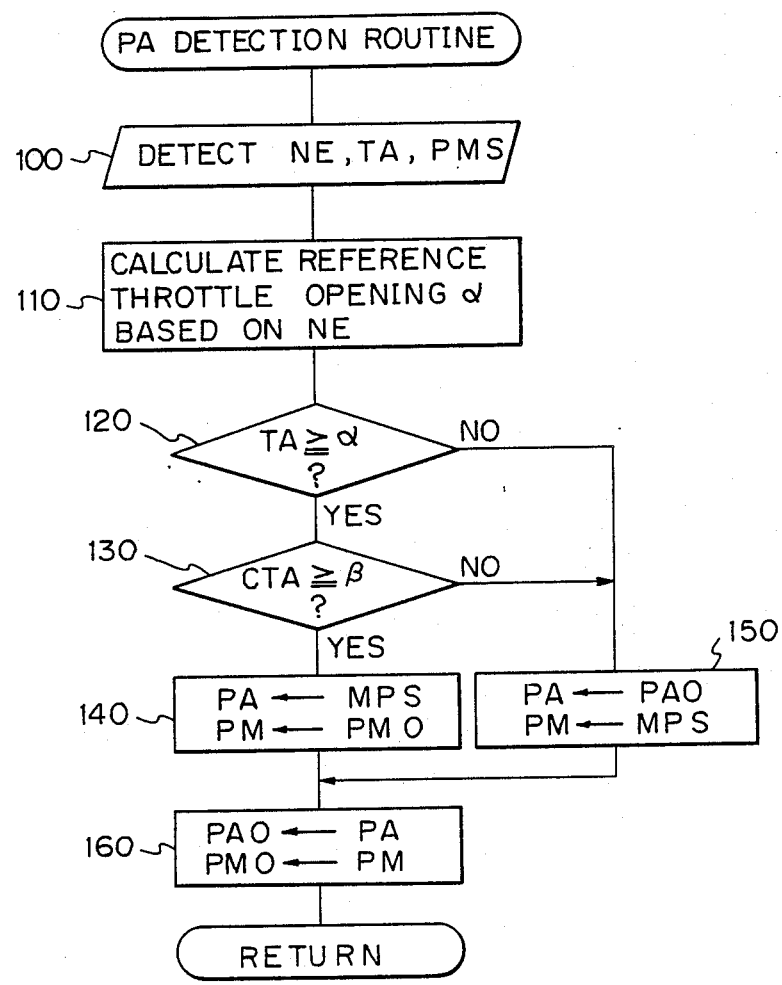
FIG. 4 is a flow chart for executing an atmospheric pressure detection based on an output from a pressure sensor provided in an intake pipe.

FIG. 2 is a flow chart for calculating a control variable for controlling the engine and including a correction step when the EGR valve 26 is opened, according to the first embodiment of the present invention. In this embodiment, the control variable is a fuel injection time period of the fuel injectors 46 for controlling an amount of fuel to be supplied to the engine. Note, the present invention is also applied to the control of ignition timing, and therefore, characters referring to the ignition timing are shown in parentheses. FIG. 4 is a flow chart for executing an atmospheric pressure PA detection based on an output from the pressure sensor 16 attached to the surge tank 14. The atmospheric pressure can be detected by an exclusive sensor other than the pressure sensor 16, but according to the following technique, it is possible to detect the atmospheric pressure and the intake pressure by only one pressure sensor 16.

Referring to FIG. 4 the atmospheric pressure PA detection is carried out by an interruption at a predetermined time interval, for example, every four milliseconds. At step 100, the engine revolutional speed NE, the opening TA of the throttle valve 10, and the intake pressure PMS (a detected value of the intake pressure is represented by PMS in FIG. 4) are detected by the speed sensor 34, the throttle sensor 12, and the pressure sensor 16, respectively, and stored in the memory. At step 110, the reference throttle opening $\alpha$ is calculated, in relation to the detected revolutional speed NE, from the map of FIG. 5.

At step 120, it is determined whether the throttle opening TA is greater than the reference throttle opening $\alpha$. If the result is YES, the program goes to step 130, and if the result is NO, the program goes to step 150. At step 130, it is determined whether a lapsed time CTA is greater than a predetermined value $\beta$, the lapsed time CTA being measured from a point at which the throttle opening TA first becomes greater than the reference throttle opening $\alpha$. If the result is YES, the program goes to step 140, and if the result is NO, the program goes to step 150.

Figure 5:
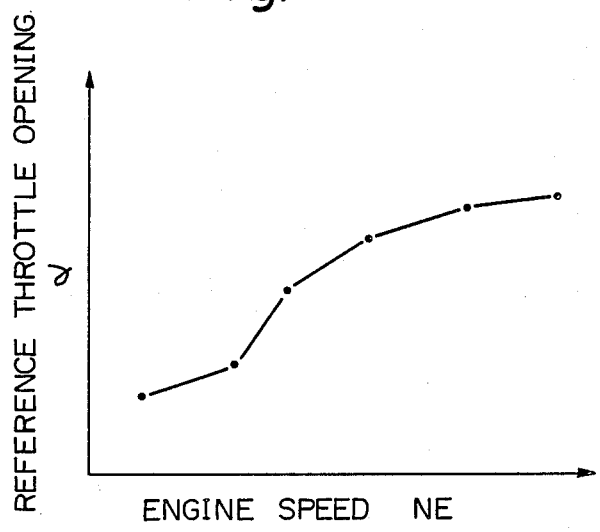
FIG. 5 is a graph of a reference throttle opening $\alpha$ used in FIG. 4 for detecting the atmospheric pressure.

The reference throttle opening $\alpha$ is a relatively large value so that the result of YES at step 120 means that the throttle valve 10 is almost fully open, and in such case, the intake pressure becomes closer to the atmospheric pressure. The reference throttle opening $\alpha$ is decided as a function of the detected revolutional speed NE, as shown in FIG. 5, i.e., the greater the revolutional speed NE, the greater reference throttle opening $\alpha$, to make it possible to detect the atmospheric pressure in a broad range of the degree of opening of the throttle valve 10. A result of YES at step 130 means that the atmospheric pressure PA detection is delayed, due to acceleration of the engine, until the intake pressure becomes stable, and thus, at step 140, the atmospheric pressure PA is detected and a value of the detected intake pressure PMS is stored. Further, the intake pressure PM is made PMO, which is a renewal memory of the intake pressure PM at the previous cycle. Then, at step 160, a renewal memory of the atmospheric pressure PAO stores the value PA and the renewal memory of the intake pressure PMO stores the value PM. In this case, at step 150, the atmospheric pressure PA differs from the intake pressure and the atmospheric pressure PA is made to PAO, which was stored at step 160 at the previous cycle, and the intake pressure PM stores the value of the detected intake pressure PMS.

Referring to FIG. 2, at step 200, the engine revolutional speed NE, the atmospheric pressure PA, and the intake pressure PM can be read from the memories, as explained with reference to FIG. 4, and thus at step 210, it is determined whether the EGR valve 26 is open. The operation of the EGR valve 26 is controlled by delivering a control signal to the solenoid-operated valve 30, as explained previously, in accordance with the operating condition of the engine. For example, the EGR valve 26 is closed when the temperature of the engine cooling water is lower than a predetermined value and when the load of the engine is higher than a predetermined value. If the result is YES at step 210, the program goes to step 260 through steps 220 and 230, but if the result is NO, the program goes directly to step 260.

At step 220, a converted intake pressure PMT, which is a converted value under the standard atmospheric pressure (760 mm/Hg) of the detected intake pressure PM under the detected atmospheric pressure PA, is calculated from the relationship, $PMT = PM \times 760/PA$.

Figure 6A:
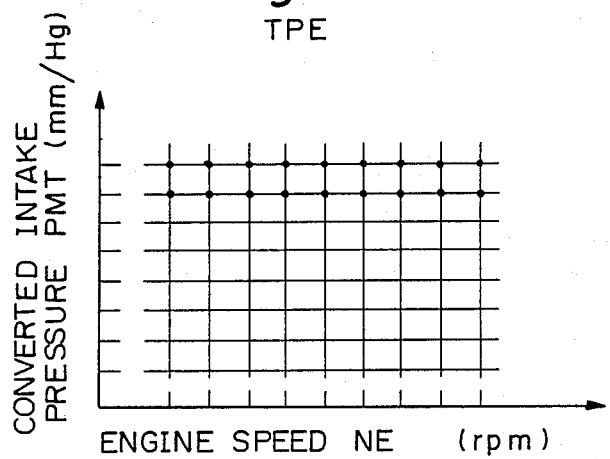
FIG. 6A is a graph or a map of an estimated value TPE as a function of a converted intake pressure PMT and an engine revolutional speed NE used in FIG. 2.

Then, at step 230, an estimated value TPE (AEG) of the fuel injection time period (the ignition timing) is calculated from a map stored in the ROM 52, and schematically exemplified in FIG. 6A, as a function of the converted intake pressure PMT and the detected revolutional speed NE.

Figure 6B:
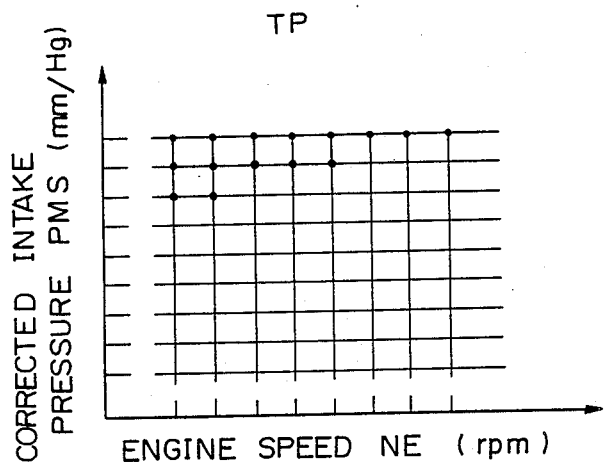
FIG. 6B is a graph or a map of a fundamental value TP as a function of an intake pressure PMS and an engine revolutional speed NE used in FIG. 2.

Then, at step 260, a fundamental fuel injection time period TP (AB) is calculated from a map also stored in the ROM 52, and schematically exemplified in FIG. 6B, in response to the detected intake pressure PM (a corrected intake pressure PMS is used in FIG. 6B, but here PM=PMS) and the detected revolutional speed NE, regardless of whether the EGR valve 26 is open or closed.

Figure 8A:
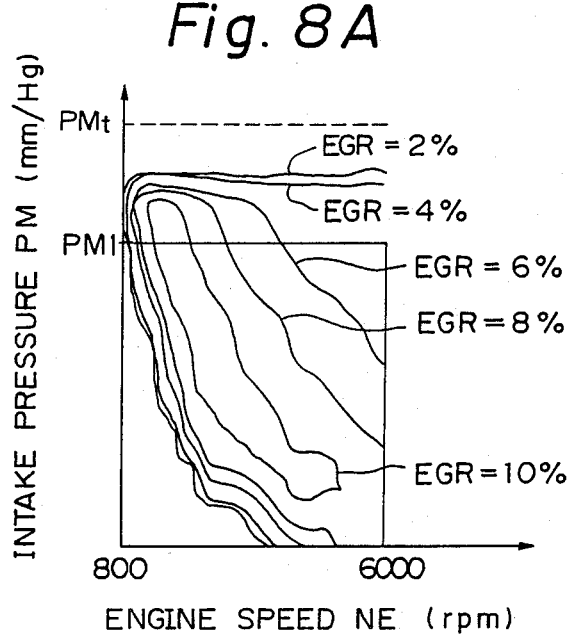
FIG. 8A is a graph or a map of an EGR rate as a function of an intake pressure PM and an engine revolutional speed NE, attained at a normal altitude.
Figure 8B:
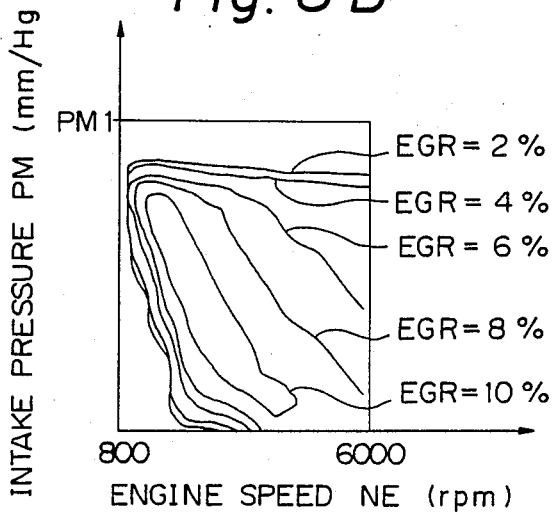
FIG. 8B is a graph or a map of an EGR rate as a function of an intake pressure PM and an engine revolutional speed NE, attained at a high altitude.

Note, the rate or amount of the EGR gas in the intake air varies for a given intake pressure if the altitude varies, as described with reference to FIGS. 8A and 8B, and information concerning the EGR gas cannot be represented merely by the detected intake pressure PM. In this regard, a conventional control device, as previously described, includes a plurality of maps in correspondence with the features of FIGS. 8A and 8B and further intermediate maps between the features of FIGS. 8A and 8B, to cover substantially the entire altitude range to precisely control the air-fuel ratio. It is possible, according to the present invention, to prepare only one map for the calculation or estimation of the fuel injection time period when the EGR valve 26 is open, to cover substantially the entire altitude range. For this purpose, the concept of the converted intake pressure PMT is introduced and the map of FIG. 6A is prepared by including the information about the EGR gas shown in FIG. 8A at which the atmospheric pressure is standard. For example, PMt on the ordinate in FIG. 8A is a converted value under the standard atmospheric pressure of the detected intake pressure PM1 under the detected atmospheric pressure PA on the ordinate in FIG. 8B, and it will be understood that the conversion is such that an amount of the EGR gas attained under the detected intake pressure PM1 (as measured in FIG. 8B) corresponds to that attained under the converted intake pressure PMt (as measured in FIG. 8A).

Finally, at step 290, a final fuel injection time period TAU (AEX) to be delivered to the fuel injectors 46 is calculated by the relationship, $TAU = FK \times (TP - TPE)$, where FK is a conventional correction factor.

This relationship includes a correction of the fundamental fuel injection time period TP by subtracting the estimated fuel injection time period TPE from the fundamental fuel injection time period TPE.

When the control variable is the ignition timing, the final ignition timing AEX to be delivered to the ignition plugs 42 is calculated by the relationship, $AEX = AEG + AB + AY$, where AY is a conventional correction factor.

Figure 3:
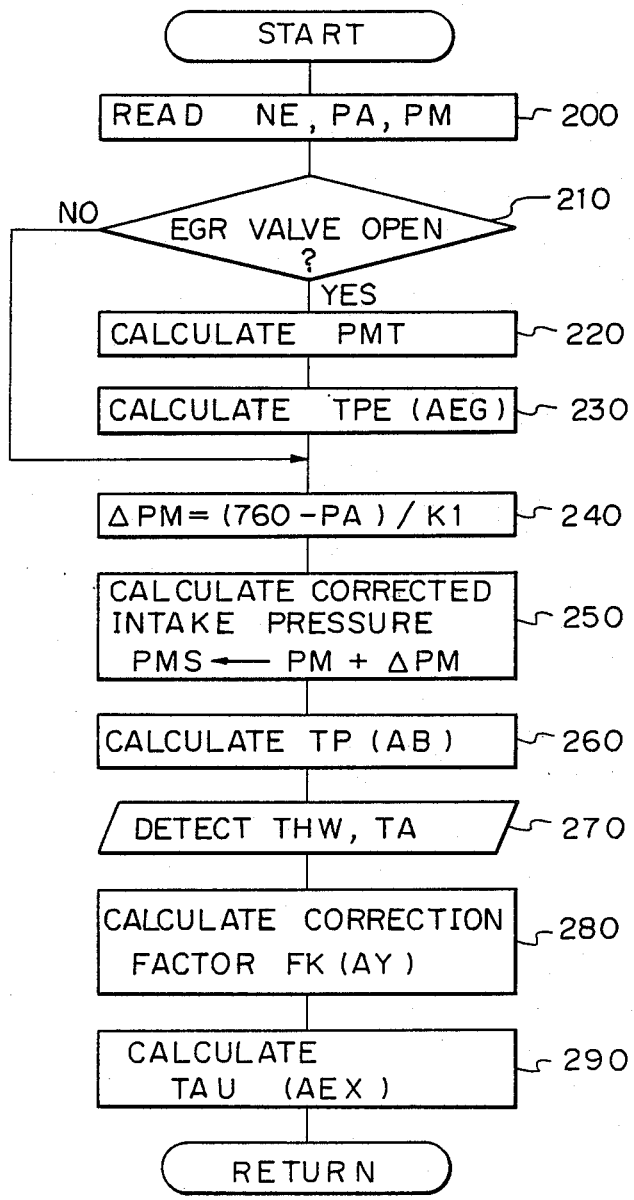
FIG. 3 is a modification of the flow chart in FIG. 2, including additional correction steps.

FIG. 3 is modification of FIG. 2, including additional correction steps. Note, steps 200, 210, 220, 230, 260, and 290 are identical to those in FIG. 2, and therefore, only the additional steps 240, 250, 270, and 280 are described. At step 240, a deviation pressure PM is calculated by the relationship, $\Delta PM = (760 - PA)/K1$, where the K1 is a constant (11.125, for example).

Figure 7:
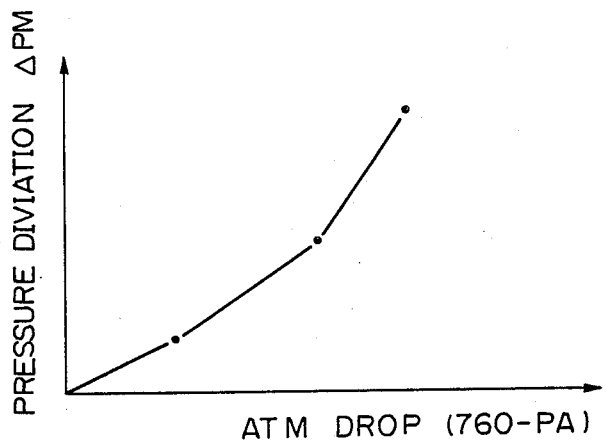
FIG. 7 is a graph of a pressure deviation $\Delta PM$ in relation to an atmospheric pressure drop used in FIG. 3.

$\Delta PM$ can be alternatively calculated by the relationship, $\Delta PM = K2 \times \Delta PA/(PM + K3)$, where the K2 and K3 are constants, and $\Delta PA = (760 - PM)$, or by a map, as schematically shown in FIG. 7.

At step 250, a corrected intake pressure PMS is calculated by the relationship, $PMS = PM + \Delta PM$. The corrected intake pressure PMS is used for the calculation of the fundamental fuel injection time period TP at step 260, to compensate a change in the volumetric efficiency of the intake air caused at a high altitude or to precisely correct a change in the density of the intake air at a high altitude, since the map of FIG. 6B is based on the standard atmospheric pressure. But, these steps 240 and 250 can be deleted, if desired.

At step 270, several engine operating conditions, such as the temperature THW of the engine cooling water and the opening TA of the throttle valve 10, are detected. Then at step 290, a conventional correction factor FK (AEX) is calculated from such engine operating parameters.

Figure 6C:
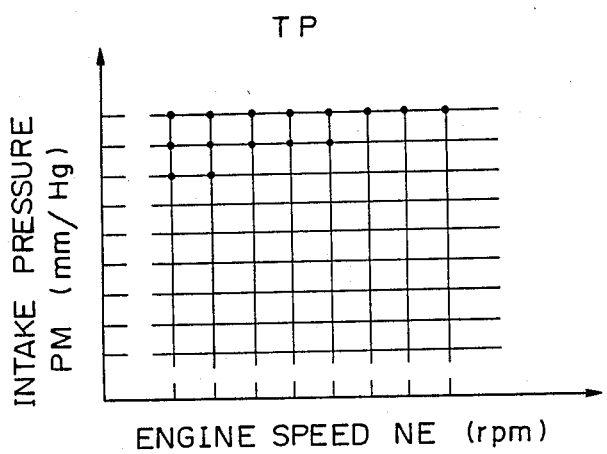
FIG. 6C is a graph or map of a fundamental value TP as a function of an intake pressure PM and an engine revolutional speed NE used in FIG. 9.
Figure 10:
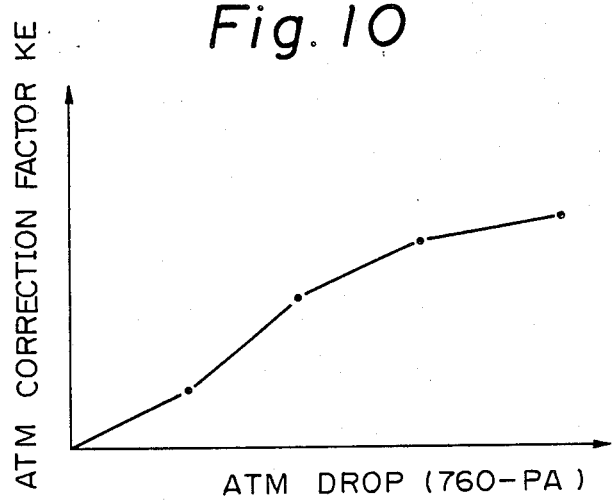
FIG. 10 is a graph of an atmospheric pressure correction factor KE in relation to an atmospheric pressure drop used in FIG. 9.
Figure 9:
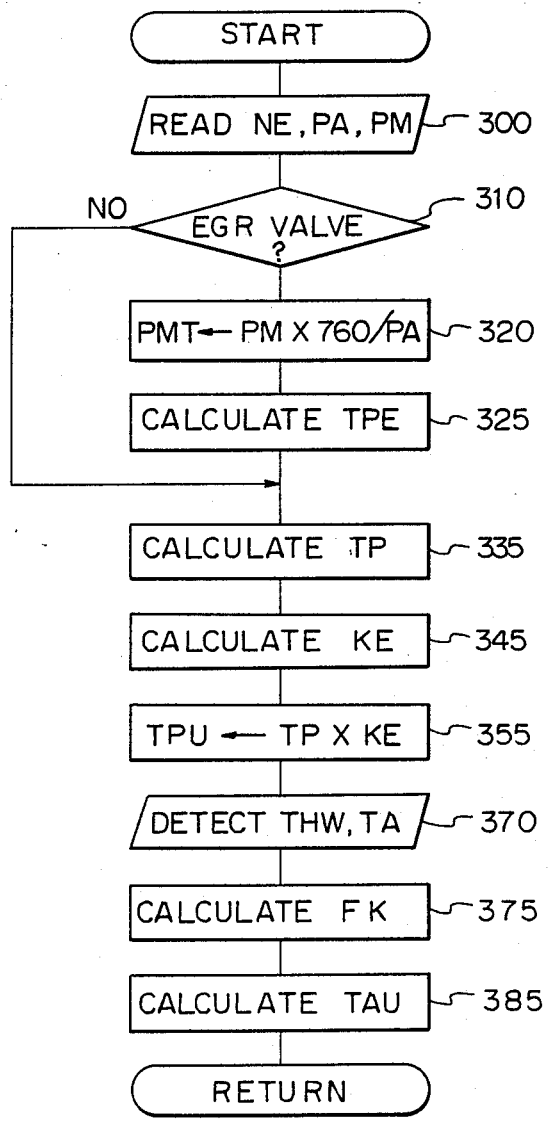
FIG. 9 is a flow chart for calculating a control variable for controlling the engine and including a correction step when an EGR valve is opened, according to a second embodiment of the present invention.

FIG. 9 is a flow chart for calculating a fuel injection time period, according to the second embodiment of the present invention. The technique applied to the control of ignition timing is similar to that used in the first embodiment. Steps 300 to 325 in FIG. 9 correspond to steps 200 to 230 in FIG. 3, and Steps 335 to 355 in FIG. 9 correspond to steps 240 to 260 in FIG. 3, except that the order and manner of the calculation is changed slightly in FIG. 9. Namely, a fundamental fuel injection time period TP is calculated at step 335 by using a map, as schematically shown in FIG. 6C, in response to the detected intake pressure PM and the detected revolutional speed NE. Then an atmospheric pressure correction factor KE is calculated at step 345, from one of the relationships, $KE = K5 \times (760 - PA)$, and, $KE = K6 \times (760 - PA)/PM$, where K5 and K6 are constant values. The atmospheric pressure correction factor KE can be alternately calculated from a map, as schematically shown in FIG. 10, and then a primary corrected fundamental fuel injection time period TPU calculated by the relationship $TPU = TP \times KE$. It will be understood that TPU in FIG. 9 corresponds to TP at step 260 in FIG. 3. The final steps 370 to 385, corresponding to steps 270 to 290, are used to obtain a final fuel injection time period TAU ($TAU = FK \times (TP - TPE)$).

Figure 11:
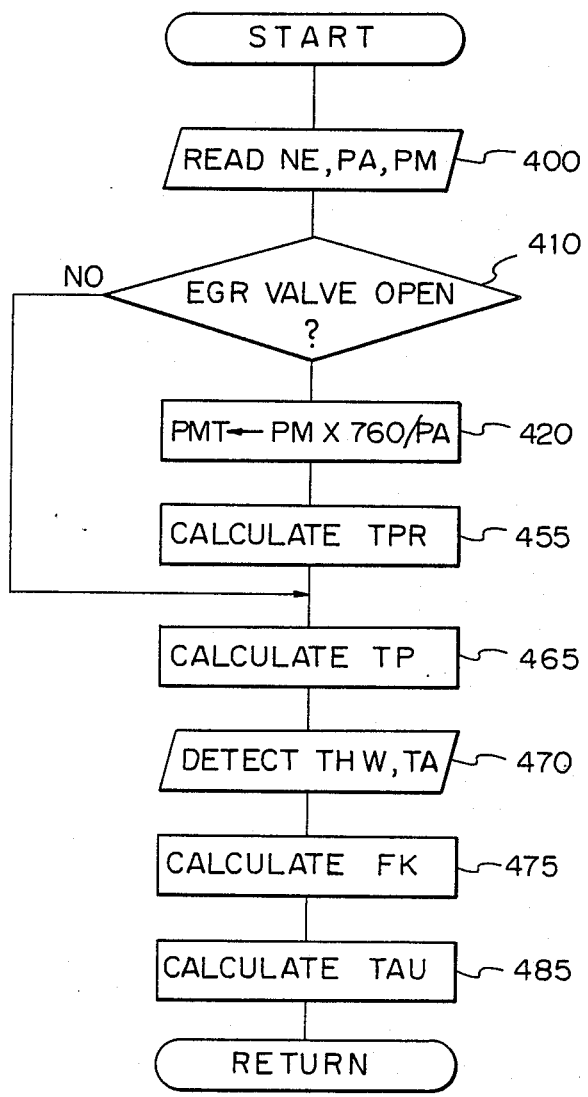
FIG. 11 is a flow chart for calculating a control variable for controlling the engine and including a correction step when an EGR valve is opened, according to a third embodiment of the present invention.
Figure 12:
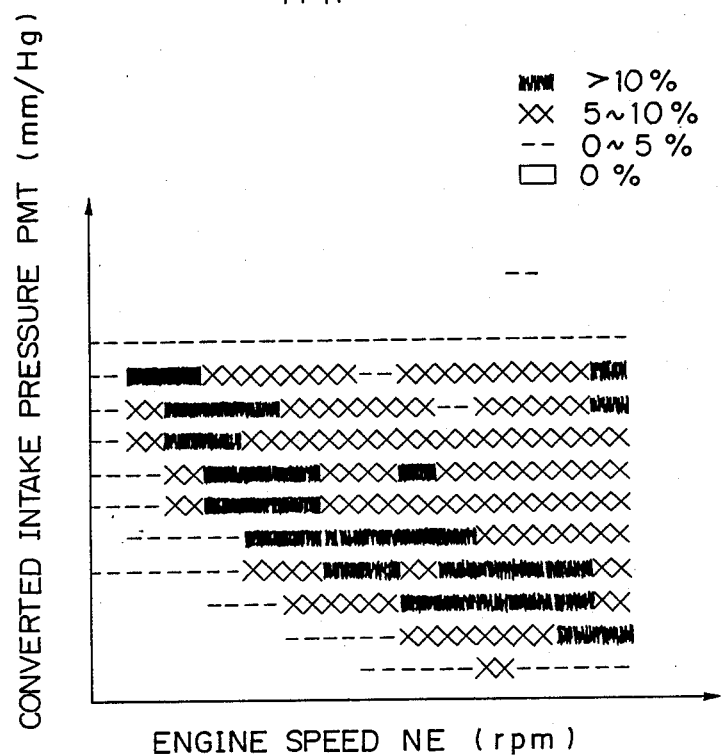
FIG. 12 is a graph or a map of an estimated rate TPR as a function of a converted intake pressure PMT and an engine revolutional speed NE used in FIG. 11.

FIG. 11 is a flow chart for calculating a fuel injection time period, according to the third embodiment of the present invention. The technique applied to the control of ignition timing is similar to that used in the previous embodiments. Steps 400 to 455 in FIG. 11 correspond to steps 200 to 230 in FIG. 3, except that an estimated rate TPR is used at step 455 in place of the estimated value TPE of the fuel injection time period in the previous embodiments. In this case, a map of TPR is prepared, as shown in FIG. 12, as a function of the converted intake pressure PMT and the revolutional speed NE. The estimated rate TPR is represented by a percentage relative to the fundamental fuel injection time period TP and the relationship between the TPR and TP corresponds to the relationship between the amount of the EGR gas and the intake air. In the map shown in FIG. 12, areas marked in black show that the rate of the EGR gas in the intake air is greater than ten percent of the intake air, and portions marked by indicate a rate of five to ten percent, and portions marked by bars indicate a rate of zero to five percent. The rate is zero in the remaining area.

At step 465, the fundamental fuel injection time period TP is calculated from a map, as schematically shown in FIG. 6C, in response to the detected intake pressure PM and the detected revolutional speed NE. Then, at steps 470 and 475, the correction factor FK is calculated in accordance with the engine operating parameters, such as the temperature THW of the engine cooling water and the opening TA of the throttle valve 10. Then, at step 485, the final fuel injection time period TAU is calculated by the relationship, $TAU=FK \times TP \times (100-TPR)/100$. In this example, the correction factor FK is applied to the fundamental fuel injection time period TP as well as to the estimated rate TPR, to further improve the correction procedure.

FIGS. 13A to 13D show the results of tests carried out at the atmospheric pressure of 552 mm/Hg. To obtain test samples, the final fuel injection time period TAU was calculated by using the estimated value TPE or the estimated rate TPR from a map including information of the EGR gas under the standard atmospheric pressure (760 mm.Hg). To obtain reference samples (referred to as the required value), the final fuel injection time period TAU was calculated by using a reference map including information of the EGR gas under the atmospheric pressure at which the test is carried out. Errors between two the sample groups are shown by a percentage of the required value in each of FIGS. 13A to 13D, in which areas marked in black show errors greater than ten percent, portions marked by X's show errors greater than five to ten percent, and portions marked by bars show errors of from zero to five percent. The error is zero in the remaining area.

Figure 13A:
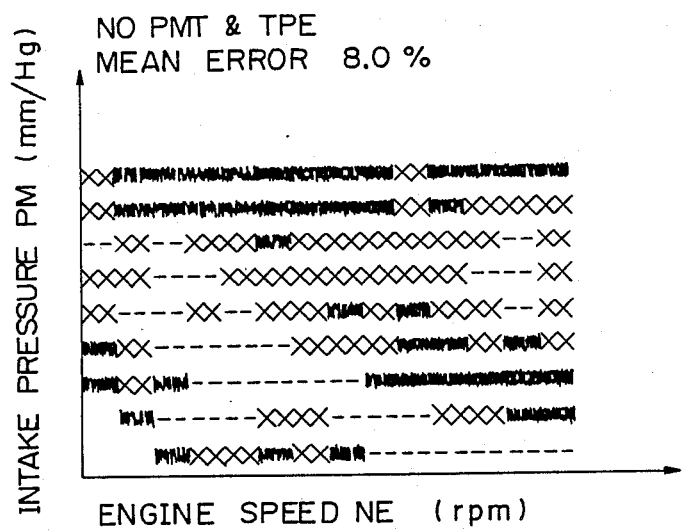
FIGS. 13A to 13D show errors between the corrected control variable and the required value.
Figure 13B:
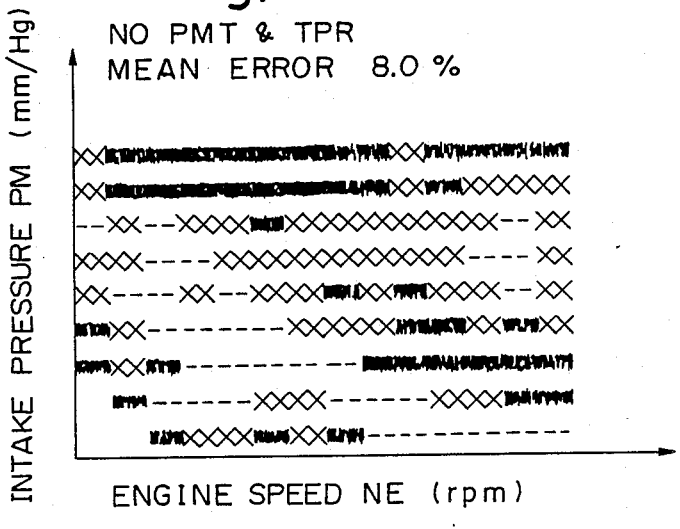
Figure 13C:
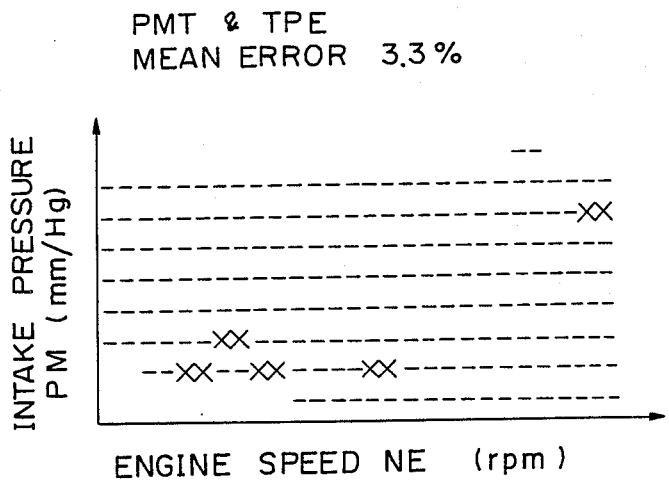
Figure 13D:
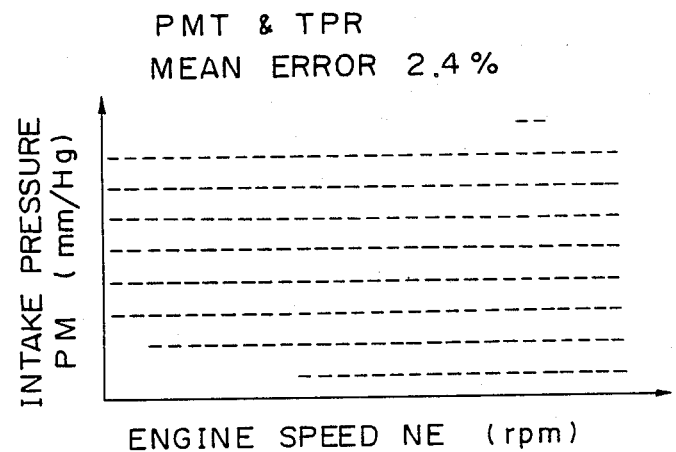

In FIG. 13A, test samples are obtained by a calculation in which the converted intake pressure PMT is not used and the estimated value TPE is used in response to the detected intake pressure PM in place of the converted intake pressure PMT, as in a conventional procedure. In FIG. 13B, test samples are obtained by a calculation in which the converted intake pressure PMT is not used and the estimated rate TPR is used in response to the detected intake pressure PM in place of the converted intake pressure PMT. In FIG. 13C, test samples are obtained by a calculation in which the converted intake pressure PMT and the estimated value TPE are used, according to FIG. 3 of the present invention. In FIG. 13D, test samples are obtained by a calculation in which the converted intake pressure PMT and the estimated rate TPR are used, according to FIG. 3 of the present invention. It will be apparent that FIGS. 13C and 13D show that the errors are small.

Figure 14A:
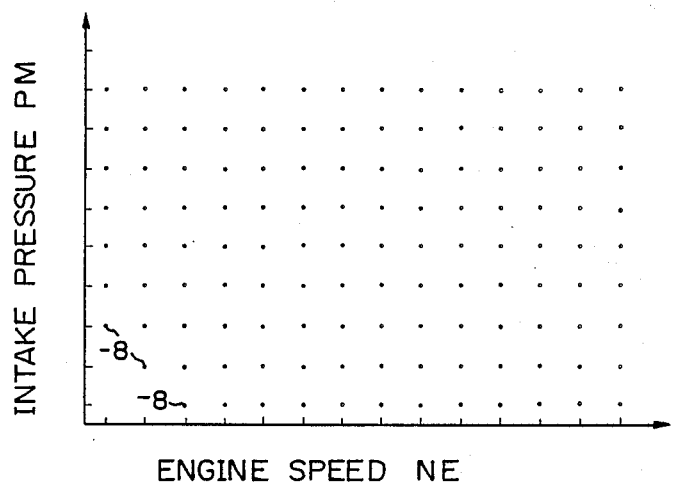
FIG. 14A is a graph of an error between the corrected control variable and the required value according to the third embodiment at an altitude of 2000 meters; and, FIG. 14B is a graph of an error between the corrected control variable calculated and the required value when the corrected control variable is calculated from the estimated rate as a function of a pressure difference between an atmospheric pressure and the intake pressure and a revolutional speed.
Figure 14B:
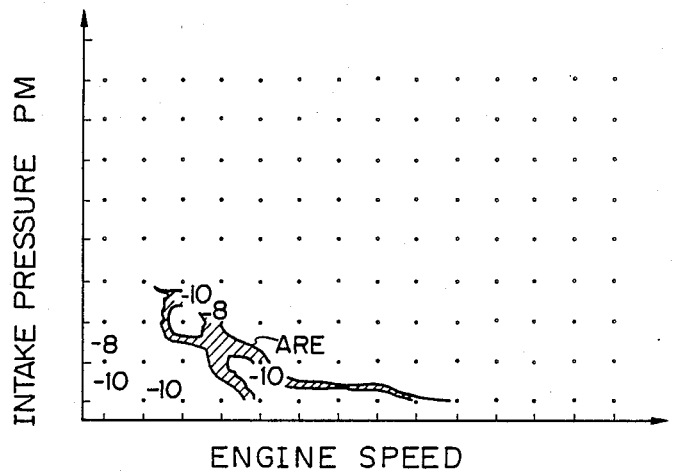

FIG. 14A shows errors in percentage between the final fuel injection time period TAU calculated according to the third embodiment of the present invention at the altitude of 2000 meters and the required value. FIG. 14B shows similar errors but the estimation calculation is carried out by using a two dimensional map in response to the differential pressure between the exhaust pressure and the intake pressure and the revolutional speed of the engine, according to a technique disclosed in the above described Japanese Unexamined Patent Publication No. 61-8444. FIG. 14B shows that errors becomes large at a portion labelled ARE. It will be apparent that FIG. 14A shows that the errors are small and, therefore, it is possible to control the engine to a state closer to the required value.

What is claimed is:

1. An electronic control device for controlling an internal combustion engine by means of a control value, said engine having an intake pipe, an exhaust pipe, an exhaust gas recirculating passage extending between said exhaust pipe and said intake pipe, and a vacuum-operated control valve arranged in said exhaust gas recirculating passage, said electronic control device comprising:
   first detecting means for detecting a revolutional speed of said engine;
   second detecting means for detecting an intake pressure in said intake pipe;
   third detecting means for detecting an atmospheric pressure;
   first calculating means for calculating a fundamental value of said control value in response to said intake pressure and said revolutional speed;
   second calculating means for converting said detected intake pressure under said detected atmospheric pressure into a converted intake pressure under a predetermined atmospheric pressure in response to said atmospheric pressure;
   third calculating means for calculating a correcting value of said control value in response to said revolutional speed and said converted intake pressure, said correcting value being in correspondence with an amount of recirculated exhaust gas attained under said predetermined atmospheric pressure when said vacuum-operated control valve is opened; and
   control means for controlling engine operation in response to said fundamental value when said vacuum-operated control valve is closed, and in response to said fundamental value and said correcting value when said vacuum-operated control valve is opened.

2. An electronic control device according to claim 1, wherein said control value is one of a fuel injection time period and an ignition timing.

3. An electronic control device according to claim 2, wherein said control means subtracts said correcting value from said fundamental value in the case of fuel injection time period, and advances said fundamental value by said correcting value in the case of said ignition timing.

4. An electronic control device according to claim 3, wherein a fourth calculating means is provided for calculating a final value of said predetermined controlled variable by applying other correction parameters representing engine operating conditions to at least one of said fundamental value and said correcting value.

5. An electronic control device according to claim 3, wherein a fifth calculating means is provided for correcting said fundamental value of said control value in response to said atmospheric pressure when said vacuum-operated control valve is closed.

6. An electronic control device according to claim 3, wherein data for calculating said correcting value of said control value is provided so that said correcting value indicates an amount of recirculated exhaust gas.

7. An electronic control device according to claim 3, wherein data for calculating said correcting value of said control value is provided so that said correcting value indicates a rate of recirculated exhaust gas in the intake air.

* * * * *